United States Patent
Bonnet et al.

(10) Patent No.: US 6,300,596 B1
(45) Date of Patent: Oct. 9, 2001

(54) FLUX-CORED WIRE FOR GAS-FLOW-SHIELDED WELDING

(75) Inventors: Christian Bonnet, Saint Gervais; Bruno Leduey, Bessancourt, both of (FR)

(73) Assignee: La Soudure Autogene Francaise, Paris Cedex (FR)

( * ) Notice: Subject to any disclaimer, the term of this patent is extended or adjusted under 35 U.S.C. 154(b) by 0 days.

(21) Appl. No.: 09/527,211

(22) Filed: Mar. 16, 2000

Related U.S. Application Data

(62) Division of application No. 09/090,887, filed on Jun. 5, 1998, now Pat. No. 6,124,569.

(30) Foreign Application Priority Data

Jun. 9, 1997 (FR) .................................................. 97 07118

(51) Int. Cl.⁷ ...................................................... B23K 9/00
(52) U.S. Cl. .............................. 219/137 WM; 219/146.1; 219/145.22; 219/146.52; 148/23
(58) Field of Search ..................................... 219/137 WM, 219/146.1, 145.22, 146.24, 146.52; 148/22, 23, 24

(56) References Cited

U.S. PATENT DOCUMENTS

| | | | |
|---|---|---|---|
| 3,585,352 * | 6/1971 | Zvanut ................................. | 214/137 |
| 3,848,109 | 11/1974 | Zvanut ................................. | 219/146 |
| 3,924,091 | 12/1975 | Suzuki et al. ........................ | 219/73 |
| 4,091,147 | 5/1978 | Kanazawa et al. .................. | 428/683 |
| 4,154,999 | 5/1979 | Pinford et al. ....................... | 219/72 |
| 4,282,420 | 8/1981 | Banks ................................. | 219/146.24 |
| 4,430,545 | 2/1984 | Mori et al. .......................... | 219/73 |
| 4,465,921 | 8/1984 | Sakai et al. ......................... | 219/146.24 |
| 4,503,129 | 3/1985 | Okuda et al. ....................... | 428/562 |
| 4,517,441 | 5/1985 | Kaljee et al. ....................... | 219/146.23 |
| 4,719,330 | 1/1988 | Ferree ................................. | 219/146.32 |
| 5,055,655 * | 10/1991 | Chai et al. .......................... | 219/145.22 |
| 5,124,529 | 6/1992 | Nishikawa et al. .................. | 219/146.22 |
| 5,622,674 | 4/1997 | Bourrat .............................. | 420/109 |
| 5,744,782 * | 4/1998 | Sampath et al. .................... | 219/146.1 |
| 5,824,992 | 10/1998 | Nagarajan et al. .................. | 219/145.22 |

FOREIGN PATENT DOCUMENTS

| | | |
|---|---|---|
| 2 696 757 | 4/1994 | (FR) . |
| 62-207598 | 9/1987 | (JP) . |
| 63-278697 | 11/1988 | (JP) . |

* cited by examiner

*Primary Examiner*—M. Alexandra Elve
(74) *Attorney, Agent, or Firm*—Young & Thompson

(57) ABSTRACT

A flux-cored wire for welding shielded by a flow of gas, in particular of the rutile or slag-free type, composed of an outer metal sheath and a central core comprising filling elements, and an MAG gas-shielded welding process using such a flux-cored wire for producing a welded joint on a steel construction, such as an offshore platform or a storage tank. The welded joint obtained has improved impact strength and improved toughness, and contains less than 65 ppm nitrogen, from 300 ppm to 0.12% carbon, from 0.01% to 0.06% silicon, from 0.9% to 1.9% manganese, from 20 ppm to 0.08% titanium, from 1 ppm to 80 ppm boron, from 5 ppm to 150 ppm aluminum, from 10 ppm to 0.02% niobium and from 10 ppm to 0.02% vanadium.

33 Claims, 1 Drawing Sheet

FLUX-CORED WIRE FOR GAS-FLOW-SHIELDED WELDING

CROSS-REFERENCE TO RELATED APPLICATIONS

This application is a division of application Ser. No. 09/090,887, filed Jun. 5, 1998, and now U.S. Pat. No. 6,124,569.

The present invention relates to a flux-cored wire for welding shielded by a flow of gas, to an MAG (Metal Active Gas) welding process, i.e. a gas-shielded welding process using such a meltable wire, and to a welded joint obtained by melting the said meltable wire.

FIELD OF THE INVENTION

The flux-cored wires used for gas-shielded welding usually consist of a tubular outer metal sheath, also called a foil, and of a central core comprising filling elements, for example a metal powder.

Such flux-cored wires are used in many gas-shielded welding procedures, in particular in the welding of normalized structural steel, TMCP (Thermo Mechanical Control Process) steel and tempered-and-annealed steel.

At the present time there are three types of flux-cored wire which can be used for the gas-shielded welding of metal workpieces, especially of structural steel workpieces, namely "basic", "rutile" and "slag-free" wires, also called "metal-cored" wires. These various flux-cored wires are differentiated by the nature of the various elements of which they are composed.

Thus, depending on the type of flux-cored wire used in the welding process, there is a greater or lesser tendency for the flux-cored wire to undergo soft melting, arc stability may increase or decrease, positional welding may become easier or harder, the amount of molten metal spattered may increase or decrease, etc.

Likewise, depending on the type of flux-cored wire used in the welding process, and therefore depending on the nature and content of the various elements of which this flux-cored wire is composed, the metallurgical properties of a weld obtained, i.e. of a metal deposited, will vary greatly.

Thus, it is known that the characteristics of the weld depend on the content of the metal deposited in terms of its various elements such as, in particular, the elements: oxygen, titanium, niobium, vanadium, hydrogen, etc.

By way of example, Table I below indicates, on the one hand, the main elements involved in the constitution of the 3 aforementioned different types of flux-cored wires and, on the other hand, for each of them, the operational and compositional consequences which conventionally result therefrom.

TABLE I

| TYPE OF FLUX-CORED WIRE | RUTILE | BASIC | SLAG-FREE |
|---|---|---|---|
| Non-metallic elements in the wire | $TiO_2$, $SiO_2$, $Al_2O_3$, Ionizing elements | $CaF_2$, $CaCO_3$, MgO, Ionizing elements | <1% Ionizing elements |
| Metallic elements in the wire | Deoxidizing agents, alloying elements | Deoxidizing agents, alloying elements | Deoxidizing agents, alloying elements |
| Operating consequences | Soft melting Stable arc Positional welding easy Wide range of metal transfer by spraying | Globular transfer Spatter Positional welding difficult | Soft melting Stable arc |
| Content of the deposited metal (weld) | $O_2$: 600–1000 ppm Ti: 300–800 ppm Nb: 100–300 ppm V: 50–250 ppm $H_2$: 4 to 15 ml | $O_2$: 300–400 ppm Ti: adjustable Nb: adjustable V: adjustable $H_2$: <5 ml | $O_2$: 600–1000 ppm Ti: adjustable Nb: adjustable V: adjustable $H_2$: 1 to 6 ml |

It is apparent from the above Table I that the flux-cored wires of the "rutile" type, based on titanium oxide ($TiO_2$), have better operating properties than the other types of wire: very good arc stability, a regime of metal transfer by axial spraying for a wide range of parameters resulting in the almost complete absence of spatter during welding, slag with a high melting point allowing a high deposition rate in positional welding, etc.

However, from the composition of its slag, i.e. of the filling elements of which its central core is composed, the "rutile"-type flux-cored wire has the drawback of leading to a weld containing residual elements (oxygen, niobium, vanadium, etc.) which tend to prevent optimum mechanical properties of the deposited metal, i.e. the weld, being achieved.

More specifically, the oxygen content of the deposited metal, although this may vary depending on the nature and quantity of deoxidizing elements present in the filling powder, cannot, in the case of "rutile"-type wires, be reduced to as low a level as, for example, in the case of "basic"-type wires.

It follows that a weld produced using a "rutile"-type wire has a lower ductile fracture energy due to a higher amount of inclusion.

Likewise, since the slag of the "rutile"-type wire is mostly composed of rutile, i.e. of titanium oxide ($TiO_2$), titanium is inevitably found in the deposited metal and in a quantity which varies depending, in particular, on the oxido-reduction reactions occurring in the arc and on the metal-slag exchanges taking place within the weld pool, i.e. within the molten metal.

The titanium content of the deposited metal cannot therefore be adjusted as required, but depends closely on all the chemical elements present, which must be balanced depending on the mechanical properties (tensile strength, yield stress, etc.) which the weld must have, which themselves depend on the type of steel that has to be welded.

Furthermore, with regard to the niobium and vanadium contents of the deposited metal, these also cannot be reduced below a certain threshold, given that these elements exist as impurities in the natural titanium oxides normally used for manufacturing welding products.

The use of synthetic and therefore relatively pure, titanium oxide partly solves this problem, but to the detriment of a significant increase in the cost of the flux-cored wire and at the cost of greater complexity of the process for manufacturing the latter.

Extensive research carried out with the aim of improving the metallurgical properties of "rutile"-type flux-cored wires have resulted in flux-cored wires exhibiting a "titanium-boron" effect.

Specifically, it has been shown that the presence of a very small quantity of boron, in general 20 to 60 ppm, in the deposited metal considerably retards the appearance of proeutectoid ferrite at the austenitic grain boundaries as the weld deposit cools down.

Thus, transformation of the austenite can occur by intragranular nucleation of ferrite on the fine inclusions, which are always present in a weld, provided that the latter contain a certain quantity of titanium.

A structure having very fine ferrite grains is usually called "acicular ferrite"; it has improved tensile properties (tensile strength, yield stress, etc.) and toughness (Charpy V-notched impact strength, CTOD, etc.).

In other words, during cooling of the weld, the titanium-boron effect prevents the formation of coarse proeutectoid ferrite, which is very prejudicial to the toughness of the weld, and finally produces a structure of the acicular-ferrite type, consequently making the welds produced using wires of the rutile type (but also of the slag-free type) compatible, in the as-welded state, with the most stringent industrial requirements, which could not be met by wires of the basic type.

However, although the results obtained are satisfactory in the as-welded state, the same does not apply when the weld undergoes a postwelding heat treatment necessary, in particular, for stress relieving the weldment, especially in the case of joining very thick workpieces.

This is because it has been observed that a weld produced by means of a "titanium-boron" rutile wire, which was subjected to a subsequent heat treatment, lost its metallurgical properties and therefore the benefit provided by the "titanium-boron" effect.

Consequently, several publications report tests relating to the formulation of filling powders for flux-cored wires, in particular of "rutile" type, which were intended to improve the behaviour of the welds after a postwelding heat treatment.

Furthermore, among the various elements which may be found in flux-cored wires, mention should be made of nitrogen.

Thus, document JP-A-63,220,996 teaches a flux-cored wire whose sheath contains 220 ppm nitrogen.

Furthermore, documents JP-A-63,278,697 describes a flux-cored wire containing 1–12% metal fluoride, 0.1–1.5% metal carbonate, 0.2–3% of one or more mineral silicates and silica chlorides, 0.2–2% silica, 1–2.5% manganese, 0.05–0.3% titanium and 0.1–1% magnesium; the weight of the filling flux representing from 10 to 30% of the total weight of the flux-cored wire.

Moreover, the document I.S.I.J. INTERNATIONAL, Vol. 35, 1995, VO 10 teaches, moreover, that the low-temperature impact strength of the weld is improved by increasing the nitrogen content up to levels reaching the preferred values of about 80 ppm.

However, at the present time none of the existing flux-cored wires, in particular of the rutile type, produces a weld having good toughness and impact-strength properties after a postwelding heat treatment.

SUMMARY OF THE INVENTION

One of the aims of the present invention is therefore to solve the abovementioned problem and to provide a flux-cored wire, in particular of the rutile or slag-free type, for gas-shielded welding, especially for structural steels, such as normalized, TMCP or tempered-and-annealed steels, making it possible to obtain a weld having excellent low-temperature toughness and impact-strength properties, both in the as-welded state and after a stress-relieving heat treatment.

Another objective is to provide a flux-cored wire making it possible to obtain a reliable and homogeneous weld, i.e. having the same properties in all the zones of the molten metal of the weld, in particular in the case of a multiple-pass weld.

In general, the properties of a weld depend on the various elements of which the weld is composed and on their respective relative proportions, given that these elements may have, depending on the case, intrinsic actions which are independent of each other or actions which are combined with each other, especially of the synergistic type or, conversely, of the antagonistic type.

Thus, in most cases, the presence of a particular element in the wire and/or the deposited metal has a positive influence on certain mechanical properties of the weld which results therefrom and a negative influence on other properties.

Consequently, to find a suitable formulation for a flux-cored wire is not an easy thing to do when it is desired to balance the composition of the welded joint, i.e. the deposited metal, in order to obtain a weld having optimum mechanical properties for a given application, such as the strength and toughness.

Furthermore, it is also necessary, or even indispensable, also to take into account the operating parameters. This is because, it may be readily understood that a flux-cored wire achieving a good metallurgical compromise is of no use if the formulation, i.e. its composition, used for manufacturing it makes it very difficult to use from an operating standpoint.

Thus, basic-type flux-cored wires are reputed to have a greatly superior metallurgical potential to rutile-type flux-cored wires but, on the other hand, have operating characteristics which are greatly inferior to those of the rutile wires, especially in terms of arc stability, amount of spatter, productivity in positional welding, etc.

This has then resulted in a gradual disappearance of this type of flux-cored wire on the market as the metallurgical properties of rutile flux-cored wires advance and improve.

Consequently, there is a real need for flux-cored wires which are acceptable not only from the standpoint of their metallurgical properties but also from the standpoint of their operating properties, this problem having hitherto not been solved or only partially solved.

Faced with this problem, the inventors of the present invention have demonstrated that the total content of the flux-cored wire in terms of certain base elements, especially nitrogen, of the deposited metal surprisingly played an essential role in the quality and properties of the weld, especially in its toughness and its impact strength.

More specifically, the inventors have discovered that, in order to obtain a quality weld, in particular after a treatment for stress relieving the weldment thus obtained, it is necessary to have, on the one hand, a low nitrogen content in the deposited metal and, on the other hand, a defined content in terms of the other constituents likely to be found therein such as, especially, aluminum, boron, niobium, vanadium, manganese, titanium, carbon, nickel, chromium and, in particular, aluminum and titanium, etc.

The present invention therefore relates to a flux-cored wire for gas-shielded welding, preferably MAG welding, composed of at least one outer metal sheath and at least one central core comprising filling elements, characterized in that it contains, with respect to the total weight of the flux-cored wire:

- less than 75 ppm nitrogen, preferably less than 60 ppm nitrogen and advantageously less than 50 ppm nitrogen,
- from 0.1 to 1% silicon, preferably from 0.2% to 0.9% silicon and advantageously from 0.25% to 0.75% silicon,
- from 1% to 2.5% manganese, preferably from 1.2% to 2% manganese and advantageously from 1.4% to 1.8% manganese,
- less than 7% titanium,
- from 1 ppm to 110 ppm boron, preferably from 20 ppm to 90 ppm boron and preferably from 25 ppm to 70 ppm or 80 ppm boron,
- less than 0.3% aluminum, preferably from 1 ppm to 0.2% aluminum and advantageously from 5 ppm to 0.1% aluminum,
- from 10 ppm to 200 ppm niobium, preferably from 10 ppm to 130 ppm niobium and preferably from 10 ppm to 100 ppm niobium, and
- from 10 ppm to 200 ppm vanadium, preferably from 10 ppm to 130 ppm vanadium and preferably from 10 ppm to 100 ppm vanadium.

Within the context of the invention, it will be assumed that the total content of a given element in a flux-cored wire, for example nitrogen, is equal to the sum of the contents of the given element, for example nitrogen, in the various constituents of the flux-cored wire, namely, on the one hand, the sheath, and, on the other hand, the various filling elements.

Thus, for example, in the case of nitrogen the total content of nitrogen ($N_2$) may be determined by applying the following formula (I):

$$[N_2]_t = (1-t) \cdot [N_2]_s + \sum_{i=1}^{i=n} [N_2]_i \cdot [I] \cdot t \quad (I)$$

in which $[N_2]_T$ represents the total nitrogen content (ppm by weight) of the flux-cored wire;

t represents the filling fraction of the flux-cored wire and is given by the following formula (II):

$$t = \frac{\text{Weight of the filling elements}}{\text{Filling elements weight} + \text{Sheath weight}} \quad (II)$$

$[N_2]_s$ represents the nitrogen content (ppm by weight) of the metal sheath of the flux-cored wire;

n represents the number of individual substances i making up the filling elements and likely to contain nitrogen;

$[N_2]_i$ represents the nitrogen content (ppm by weight) of each individual substance i; and

[i] represents the proportion of each substance i with respect to the total weight of filling elements.

Of course, the respective total contents of each of the other elements of which the flux-cored wire is composed may be determined in a similar manner.

Depending on the case, the flux-cored wire according to the invention may contain:

- from 300 ppm to 0.14% carbon (excluding carbonates), preferably from 0.03 to 0.1% carbon and preferably from 0.03% to 0.08% carbon, and/or
- from 0.2% to 1% magnesium and/or zirconium, preferably from 0.3% to 0.9% magnesium and/or zirconium (Zr) and preferably from 0.4% to 0.8% magnesium and/or zirconium, and/or
- from 0.01% to 0.35% sodium, potassium and/or lithium (the sum of the contents of the elements Li, Na and K possibly present is considered here), preferably from 0.03% to 0.3% sodium (Na), potassium (K) and/or lithium (Li) and preferably from 0.04% to 0.25% sodium, potassium and/or lithium, and/or
- from 0.03% to 10% fluorine (F), this having a favourable effect on the diffusible hydrogen and/or
- less than 0.02% sulphur, phosphorus, tin, antimony and/or arsenic (the respective contents of the elements S, P, Sn, Sb and As possibly present are considered here, and not the sum of the contents of the various elements), preferably from 1 ppm to 0.012% sulphur, phosphorus, tin, antimony and/or arsenic and preferably from 10 ppm to 0.009%.

Furthermore, the flux-cored wire of the invention has a Bruscato coefficient (X) such that:

$$X=0.1\times[P]+0.05\times[Sb]+0.04\times[As]+0.01\times[Sn]$$

with X<20 ppm, preferably X<15 ppm and advantageously X<12 ppm, where [P], [Sb], [As] and [Sn] are the total amounts (in ppm) of phosphorus, antimony, arsenic and tin, respectively, in the flux-cored wire.

In general, the outer sheath represents at least 50% of the total weight of the flux-cored wire, preferably from 65 to 90% of the total weight of the flux-cored wire.

Moreover, the diameter of the flux-cored wire is normally between 0.8 mm and 2.4 mm, preferably between 1 and 2 mm and advantageously between about 1.20 and about 1.60.

Depending on the embodiment chosen or the subsequent application in question, the flux-cored wire is preferably of the rutile ($TiO_2$) type or of the "slag-free" type.

For a rutile-type wire, the $TiO_2$ content of the wire may vary between 3 and 12%, which corresponds to a titanium content of 2% and 7%, approximately.

Furthermore, the fluorine content of the rutile flux-cored wires may vary between 0.03% and 0.15%, preferably between 0.05% and 0.09%.

For a wire of the "slag-free" type or for a wire of the "basic" type, the titanium content is 80 ppm to 2000 ppm, approximately, preferably from 100 to 1000 ppm and advantageously from 110 to 500 ppm.

On the other hand, the fluorine content of "slag-free" flux-cored wires may vary between 0.02% and 0.15%, preferably between 0.035% and 0.09%, while for a "basic"-type wire the fluorine content may vary between 1.6 to 10%, because of the presence of fluorspar ($CaF_2$).

The present invention also relates to a MAG gas-shielded welding process, in which a welded joint is produced by melting at least part of a flux-cored wire according to the invention—preferably the wire is melted by supplying a welding energy of between 6 and 40 $kJ.cm^{-1}$.

From that, the invention also relates to such a welded joint which can be obtained by the process of the invention, especially a welded joint or deposited metal containing, with respect to the total weight of the welded joint, less than 80 ppm nitrogen, from 0.02% to 0.07% oxygen, from 0.02% to 0.12% carbon, from 0.15% to 0.6% silicon, from 1% to 1.9% manganese, less than 0.02% sulphur, less than 0.02% phosphorus, from 0.0025% to 0.08% titanium, from 0.0002% to 0.008% boron, less than 0.03% aluminum, preferably from 5 ppm to 150 ppm aluminum, from 10 ppm to 0.02% niobium and from 10 ppm to 0.02% vanadium.

Carbon (C) is one of the base elements of steels which affects the tensile and hardness properties of the various microstructures. Thus, to obtain a welded joint having a high tensile strength, it is desirable for the amount of carbon in the welded joint to have a relatively high value. However, it should not exceed a maximum value of 0.12% by weight as, above this, the risks of hot and cold cracking greatly increase. Moreover, given that carbon also acts as a deoxidizing agent, it is necessary to comply with a minimum carbon content of at least 0.02% by weight in the welded joint so as to allow effective removal of part of the oxygen and thus to obtain a welded joint with the correct toughness.

Silicon (Si), like carbon, is a deoxidizing agent which makes it possible to ensure good toughness of the welded joint and, moreover, has beneficial effects on the wetting of weld beads above a minimum concentration by weight of 0.15%. However, silicon also has a highly pronounced hardening effect in the various microstructures and increases the amount of martensitic and austenitic constituents of the welded joint. These have deleterious effects on the toughness of the welded joint. It follows therefore that it is necessary to keep the maximum silicon content at 0.6% by weight.

Manganese (Mn) is also one of the base elements of steels. In order to allow the appearance of a substantial quantity of acicular ferrite in the zones with the as-solidified structure and to improve their toughness, it is necessary to respect a minimum content of 0.9% by weight of manganese in the welded joint. Above this minimum content value of 0.9%, manganese plays a fundamental role in adjusting the hardenability of the molten metal to thermal welding cycles and, thus, in adjusting the quantity of acicular ferrite formed during the process of cooling the welded joint depending on the welding energy which has to be used in the envisaged application. However, it is necessary to maintain a manganese content below 1.9% by weight given that, above this figure, a deleterious hardening effect outweighs its beneficial effect of refining the microstructure of the welded joint and the toughness then generally deteriorates.

As regards sulphur (S), this considerably increases the risks of hot cracking of the welded joint when its content in the deposited metal is greater than 0.020%. Moreover, sulphur also has a deleterious effect on the ductility and toughness properties of the weld. Consequently, it is preferred to keep sulphur at a maximum concentration of at most 0.010%.

Phosphorus (P) has, like sulphur, but to a lesser extent, a negative effect on hot cracking of the welded joint when its content in the deposited metal is greater than 0.020%. Furthermore, during the cooling process following a postwelding heat treatment, the presence of phosphorus increases the brittleness of the weld zones which have maintained an as-solidified structure. Consequently, it is preferred, again, to keep phosphorus at a maximum concentration of at most 0.010%.

Titanium (Ti) must be present at a minimum content of 0.0025% by weight in order to ensure nucleation of acicular ferrite, which is a microconstituent indispensable for obtaining the correct toughness in the weld zones having an as-solidified structure. Above 0.080% by weight, titanium has, on the other hand, a tendency to contribute to the formation of a bainitic structure which impairs the toughness.

Boron (B) slows down the kinetics of formation of proeutectoid ferrite at austenitic grain boundaries during cooling of the weld beads. Consequently, boron makes it possible, in the presence of titanium, to increase the amount of acicular ferrite and therefore to improve the toughness of the weld above a total content of 0.0003% (3 ppm) by weight and this is so up to a content of 0.008% by weight (80 ppm). However, above 0.008%, boron increases the risks of hot cracking, which is not acceptable. In general, a boron content of 10 ppm to 70 ppm, and preferably between 20 ppm and 60 ppm, is maintained.

Niobium (Nb) and vanadium (V) contribute, in the presence of titanium, to increasing the amount of acicular ferrite and therefore the toughness characteristics of the welded joint for a minimum value of 0.001% by weight. However, these components also have a great affinity for nitrogen and carbon, so that they will precipitate in the form of carbides, nitrides or carbonitrides in the reheated zones of the welded joint during the execution of successive welding passes, as well as in all the zones during a postwelding heat treatment, and in this case with even greater intensity. It is therefore absolutely essential to limit their respective contents to at most 0.02% and preferably at most 0.01%.

As explained above, nitrogen (N) has, in solid solution or in the form of precipitates, an embrittling effect in welded joint in normalized structural, TMCP or tempered-and-annealed steels. Consequently, its total content in the deposited metal is maintained at a value of at most 80 ppm, preferably at most 60 ppm and advantageously at most 50 ppm.

In steel sheet, aluminum (Al) is often added, on the one hand, for the purpose of killing, i.e. fixing the oxygen in the form of aluminates and, on the other hand, so as to minimize the deleterious effect of nitrogen by trapping it in the form of nitrides. Consequently, care is usually taken to adjust the aluminum content in the said sheets such that the ratio of the contents, Al/N, is greater than 4. However, the same does not apply in welds of these steels. This is because it proves to be the case that producing a welded joint with such a ratio, Al/N>4, leads to a catastrophic degradation in the toughness characteristics of the welded joint as having such a ratio of contents inevitably results in at least partial suppression of the formation of acicular ferrite and to an excessive increase in the titanium content in welded joints produced using flux-cored wires of the rutile ($TiO_2$) type, thus causing a further decrease in the formation of acicular ferrite advantageously beneficial to the formation of undesirable bainitic-type microconstituents. It therefore follows that the total aluminum content must be kept at a value of less than 0.030% by weight, preferably less than 0.015% by weight and preferably less than 0.010% by weight. Furthermore, it is desirable to have a ratio of contents Al/N<4, preferably Al/N<3, more preferably Al/N<2 and advantageously Al/N<1.5.

Steelmakers generally try to decrease as far as possible the oxygen ($O_2$) content of steels since oxygen tends to reduce the toughness and ductility properties of steels because of the formation of inclusions within them. Contrary to this, an oxygen content in welds of at least 0.02% by weight proves to be indispensable for allowing, in association with titanium, the formation of fine dispersed inclusions acting as nuclei or initiators for acicular ferrite and thus for obtaining good toughness in the weld areas having an as-solidified structure. However, it is necessary to respect a maximum oxygen content of about 0.07%, preferably a maximum content of 0.06%, or even 0.055%, in order to avoid a significant decrease in the ductile fracture energy in the welded joint, as is known in the case of steels.

Within the context of the present invention, it is considered that the nitrogen content of the deposited metal is substantially equal to that of the flux-cored wire used for producing the weld. However, when the gas shield employed during the welding operation is imperfect, a slight contamination of the deposited metal by atmospheric nitrogen is sometimes observed. Nevertheless, in the present case, it is considered that the gas shield is almost perfect and therefore that such a contamination of the deposited metal by atmospheric nitrogen does not occur. In other words, for the sake of simplifying matters, it is considered that the total amount of nitrogen present in the weld, i.e. in the deposited metal, essentially comes from the flux-cored wire used for producing the weld.

Furthermore, the welded joint according to the invention may also include up to 3.5% nickel, up to 0.5% chromium, up to 0.7% molybdenum and/or up to 0.6% copper.

This is because nickel (Ni) increases, at least slightly, the hardness and tensile properties of the various microstructures involved, in solid solution, in the iron lattice. It should be noted that this favourable effect of nickel is not accompanied by a deterioration in the ductility and toughness of these microstructures. However, it is preferred to keep the nickel content below 3.5% by weight in order to avoid hot cracking of the welded joint.

Furthermore, molybdenum (Mo) is an element which improves the hardenability of steels. Its ability to cause hardening by a solid-solution effect is also appreciable. Thus, its presence in the welded joint is recommended for applications involving a high welding energy, for example from 20 to 50 kJ/cm, requiring good hot behaviour of the steel, for example at 250° or 350° C., or when the assembly involves a steel having a high or very high elasticity. For example 500 to 900 MPa. However, it is preferred to keep the molybdenum content below 0.7% by weight in order to avoid decreasing the toughness of the welded joint.

Chromium (Cr), like molybdenum, may be added to improve the tensile and hardness properties of the welded joint, in particular for steels having a high or very high elasticity. However, it is preferred to keep the chromium content below 0.5% by weight, or even below 0.3% by weight, in order to avoid, again, decreasing the toughness of the welded joint.

Copper (Cu) may be added to the molten metal in order to improve the resistance to atmospheric corrosion, in amounts up to about 0.6% by weight.

Moreover, the welded joint may include phosphorus, antimony, arsenic and/or tin and have a Bruscato coefficient (X) such that:

$$X=0.1\times[P]+0.05\times[Sb]+0.04\times[As]+0.01\times[Sn]$$

with X<20 ppm and preferably X<15 ppm, where [P], [Sb], [As] and [Sn] are the total amounts (in ppm) of phosphorus, antimony, arsenic and tin, respectively, in the said welded joint.

The invention furthermore relates to a steel component having a welded joint as described above.

Advantageously, the flux-cored wire of the invention is used for the construction of installations associated with the oil industry, such as an offshore oil platform or a storage tank, or for shipbuilding.

BRIEF DESCRIPTION OF THE DRAWINGS

The invention will now be illustrated by means of examples and with reference to the appended figures, which are given by way of illustration but imply no limitation.

DETAILED DESCRIPTION OF THE INVENTION

Figure 1:
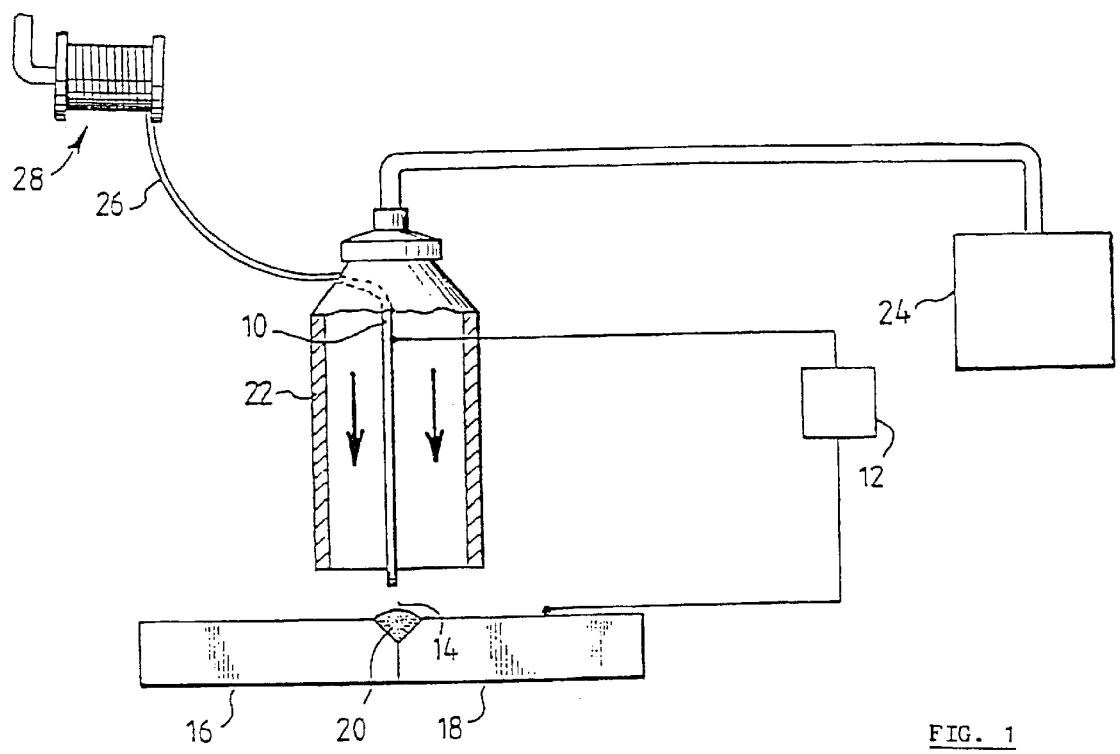
FIG. 1 is a general diagrammatic view of an MAG gas-shielded welding installation according to the invention.

FIG. 1 is a general diagrammatic view of an MAG gas-shielded welding installation according to the invention, which includes a flux-cored wire 26, connected to a current source 12 suitable for causing an electric arc 14 to be struck between a free end of the flux-cored wire 26 and a contact zone between workpieces 16 and 18 to be welded.

The flux-cored wire 26 is arranged in a nozzle 22 through which flows an oxidizing shielding gas such as the argon/$CO_2$ mixture sold by the company L'Air Liquide under the reference ATAL 5™, or any gas mixture compatible with the MAG welding process in question, delivered by an external gas source 24 so as to isolate the flux-cored wire 26 and the pool 20 of deposited metal from the ambient atmosphere. The flux-cored wire 26 is fed continuously from a feed reel 28.

Figure 2:
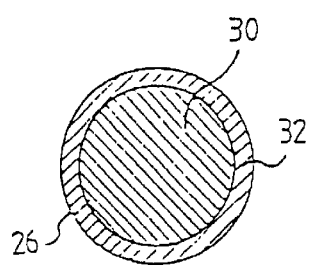
FIG. 2 is a cross-section of the fluxed-core wire.

FIG. 2 shows that the flux-cored wire 26 has a central core 30 placed in an outer metal sheath 32.

The metal sheath 32 consists of mild steel or low-allow steel and the workpieces 16 and 18 to be welded are made of structural steel.

In particular, the following welding conditions may be applied: welding current: 250 amperes, welding voltage: 27 volts, welding energy: 17.6 kJ/cm and welding speed: 23 cm/min.

EXAMPLE

Figure 3:
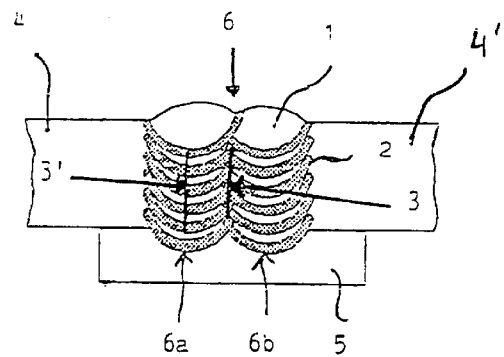
FIG. 3 shows a test piece having three parts, which are connected together by a welded joint.

The tests below were carried out by successive deposits of molten metal in two passes per layer on metal test pieces or specimens, i.e. in accordance with the French, American and Japanese standards; this is shown in FIG. 3.

The nitrogen content and the content of the other elements of the deposited metal, and therefore of the welded joint, depend on the nitrogen content and on the content of the elements of the flux-cored wire used.

Flux-cored wires of various compositions were studied, especially "rutile"-type wires.

More specifically, FIG. 3 shows a test piece having three parts 4, 4' and 5 which are connected together by a welded joint 6 produced by deposition of molten metal in two passes 6a and 6b per layer.

The welded joint 6 has annealed zones 2 (dark areas), i.e. zones which have been reheated above the austenite transformation point during execution of a subsequent pass, and unannealed zones 1 (light areas), i.e. those which have retained an as-solidified metal structure.

Currently, the standards in force require, in order to characterize the welded products, the impact strengths to be sampled by positioning the notch axially, i.e. along the weld line 3, in a zone whose metallurgical structure has been annealed by the execution of successive passes.

However, in practice, it has been observed that the toughness and impact-strength properties are generally lower, and therefore inferior, when the notch is produced along the pass axis in the unannealed zones, i.e. along the line 3' in FIG. 3, which has a negative impact on the strength of the construction produced, for example an offshore platform, a bridge, a storage tank or a ship.

In the following examples, the notches for measuring the impact strength were therefore made not only in the annealed zones (line 3) but also in the unannealed zones (line 3').

In all the examples below, the stress-relieving treatment is carried out at 580° C. for 3 h.

Example 1

The deposits of molten metal were produced by means of flux-cored wires of the rutile type with titanium-boron effect (TGS F6.56 1 Ni1 according to the AFNOR standard or E 81 T1 Ni1 according to the AWS standard) which are manufactured using the same basic formula, but are distinguished here, especially, by their nitrogen content.

Impact-strength test pieces were taken from the zones having an annealed structure and, by way of comparison, in the as-welded zones which had retained an as-solidified structure.

The contents of the main constituents of the deposited metal (weld) were determined and are given in Table II below.

TABLE II

| Trial No. | C % | Si % | Mn % | S % | P % | Ni % | Al % | Nb % | V % | Ti % | B ppm | O ppm | N ppm |
|---|---|---|---|---|---|---|---|---|---|---|---|---|---|
| A | 0.058 | 0.32 | 1.15 | 0.005 | 0.006 | 0.69 | 0.003 | 0.010 | 0.014 | 0.035 | 29 | 460 | 63 |
| B | 0.059 | 0.32 | 1.16 | 0.004 | 0.006 | 0.78 | 0.003 | 0.010 | 0.016 | 0.031 | 28 | 420 | 72 |
| C | 0.060 | 0.31 | 1.14 | 0.005 | 0.006 | 0.74 | 0.002 | 0.011 | 0.016 | 0.028 | 23 | 460 | 150 |

Furthermore, the impact strength measurements at −40° C., i.e. the values representing the impact strength of the weld, of the unannealed zones and the annealed zones, of the various test pieces (Trials A to C) before (as-welded state) and after postwelding heat treatment (stress relieving at 580° C. for 3 h) are given in Table III below.

TABLE III

| | As-welded state, kV (J) | | | | Stress-relieved state, kV (J) | | | |
|---|---|---|---|---|---|---|---|---|
| | annealed zones | | unannealed zones | | annealed zones | | unannealed zones | |
| Trial No. | average | minimum | average | minimum | average | minimum | average | minimum |
| A | 103 | 97 | 118 | 101 | 84 | 66 | 89 | 64 |
| B | 124 | 98 | 46 | 45 | 53 | 27 | 50 | 36 |
| C | 64 | 44 | 19 | 18 | 52 | 32 | 23 | 18 |

The results obtained clearly show that in the as-welded state, and if one considers only the annealed zones, the measured average impact strengths are good for Test Pieces A and B (welds containing 63 ppm and 72 ppm of nitrogen respectively) and acceptable for Test Piece C (wire containing 150 ppm of nitrogen). However, when one also considers the unannealed zones in the as-welded state, it is observed that only Test Piece A has a good impact strength value.

After the stress-relieving heat treatment, only Test Piece A (wire containing 63 ppm of nitrogen) has an acceptable impact strength. It is observed, however, that these values are more than 22% below that one [sic] which are obtained in the as-welded state, whatever the zone in question (annealed or unannealed).

This Example 1 clearly shows the advantage of decreasing the nitrogen content of the flux-cored wire on the impact strength of the weld, in particular when the latter has to undergo postwelding stress relieving.

Example 2

Example 2 is similar to Example 1, apart from the fact that the flux-cored wires used here have:

- a nitrogen content ranging between 88 ppm and 39 ppm, and
- contents of the nitride- or carbonitride-forming elements, in particular niobium (Nb) and vanadium (V), which are approximately 40% to 50% lower than those of the flux-cored wires of Example 1.

As previously, the contents of the main constituents of the deposited metal (weld) were determined and are given in Table IV below.

TABLE IV

| Trial No. | C % | Si % | Mn % | S % | P % | Ni % | Al % | Nb % | V % | Ti % | B ppm | O ppm | N ppm |
|---|---|---|---|---|---|---|---|---|---|---|---|---|---|
| D | 0.070 | 0.35 | 1.39 | 0.006 | 0.007 | 0.65 | 0.003 | 0.006 | 0.008 | 0.046 | 40 | 400 | 39 |
| E | 0.066 | 0.31 | 1.29 | 0.007 | 0.007 | 0.70 | 0.002 | 0.006 | 0.007 | 0.033 | 33 | 430 | 63 |
| F | 0.062 | 0.30 | 1.26 | 0.006 | 0.007 | 0.68 | 0.003 | 0.005 | 0.007 | 0.031 | 28 | 440 | 88 |

Furthermore, the impact strengths of each of the test pieces (Trials D to F) were measured not only at −40° C. but also at −60° C. and are, respectively, given in Tables V and VI below.

manganese (Mn) contents and, by way of comparison, variable nitrogen contents.

As previously, the contents of the main constituents of the deposited metal (weld) were determined and are given in Table VII below.

TABLE VII

| Trial No. | C % | Si % | Mn % | S % | P % | Ni % | Al % | Nb % | V % | Ti % | B ppm | O ppm | N ppm |
|---|---|---|---|---|---|---|---|---|---|---|---|---|---|
| G | 0.068 | 0.25 | 1.16 | 0.008 | 0.010 | 0.69 | 0.003 | 0.006 | 0.009 | 0.033 | 32 | 430 | 41 |
| H | 0.060 | 0.23 | 1.16 | 0.007 | 0.009 | 0.71 | 0.003 | 0.005 | 0.008 | 0.032 | 26 | 450 | 87 |

TABLE V

Impact strengths at −40° C.

| | As-welded state, kV (J) | | | | Stress-relieved state, kV (J) | | | |
|---|---|---|---|---|---|---|---|---|
| | annealed zones | | unannealed zones | | annealed zones | | unannealed zones | |
| Trial No. | average | minimum | average | minimum | average | minimum | average | minimum |
| D | 145 | 136 | 139 | 137 | 118 | 106 | 115 | 91 |
| E | 143 | 141 | 138 | 133 | 137 | 131 | 114 | 83 |
| F | 143 | 140 | 105 | 72 | 135 | 125 | 93 | 51 |

TABLE VI

Impact strengths at −60° C.

| | As-welded state, kV (J) | | | | Stress-relieved state, kV (J) | | | |
|---|---|---|---|---|---|---|---|---|
| | annealed zones | | unannealed zones | | annealed zones | | unannealed zones | |
| Trial No. | average | minimum | average | minimum | average | minimum | average | minimum |
| D | 109 | 85 | 121 | 118 | 98 | 88 | 94 | 82 |
| E | 96 | 69 | 106 | 76 | 88 | 75 | 68 | 53 |
| F | 104 | 88 | 23 | 16 | 66 | 52 | 56 | 40 |

It is apparent, from Tables IV to VI, that the more the nitrogen content of the fluxed-core wire decreases the higher is its low-temperature (−40° C. or −60° C.) impact strength, whatever the state of the weld, namely: as-welded state or stress-relieved state.

Furthermore, it may be seen that decreasing the niobium and vanadium contents contributes favourably to producing a weld with a higher low-temperature impact strength.

Furthermore, the impact strength of each of the test pieces (Trials G and H) were measured at −40° C. and are given in Table VIII below.

TABLE VIII

| | As-welded state, kV (J) | | | | Stress-relieved state, kV (J) | | | |
|---|---|---|---|---|---|---|---|---|
| | annealed zones | | unannealed zones | | annealed zones | | unannealed zones | |
| Trial No. | average | minimum | average | minimum | average | minimum | average | minimum |
| G | 141 | 137 | 136 | 131 | 143 | 138 | 127 | 122 |
| H | 125 | 101 | 65 | 46 | 113 | 105 | 31 | 24 |

In this case, as in the previous examples, it is apparent that a high nitrogen content has a deleterious effect on the mechanical properties of the weld, most particularly in the unannealed zones, i.e. those which have retained an as-solidified structure, but also in the annealed zones; in the unannealed zones, the negative effect is even more marked for a high nitrogen content of the weld, and therefore of the flux-cored wire, after stress relieving at 580° C.

Example 4

This Example 4 was produced by means of flux-cored wires of the "slag-free" type, the constituents of which make it possible to obtain a deposited metal having contents of various elements indicated in Table IX below. Owing to the nature of the wire, the titanium contents of the deposited metal are significantly lower than in the previous examples, this being in agreement with Table I.

TABLE IX

| Trial No. | C % | Si % | Mn % | S % | P % | Ni % | Al % | Nb % | V % | Ti % | B ppm | O ppm | N ppm |
|---|---|---|---|---|---|---|---|---|---|---|---|---|---|
| I | 0.03 | 0.38 | 1.63 | 0.011 | 0.010 | 0.026 | 0.004 | 0.002 | 0.008 | 0.013 | 32 | 670 | 50 |
| J | 0.042 | 0.42 | 1.70 | 0.011 | 0.010 | 0.029 | 0.004 | 0.002 | 0.005 | 0.012 | 29 | 683 | 85 |

Example 3

Example 3 is similar to Example 2, i.e. it employs flux-cored wires which have low niobium and vanadium contents but which, this time, have low silicon (Si) and The impact strengths at −40° C. of the test pieces (Trials I and J) in the as-welded state or after stress relieving at 580° C. for 3 hours are given in Table X.

TABLE X

| | As-welded state, kV (J) | | | | Stress-relieved state, kV (J) | | | |
|---|---|---|---|---|---|---|---|---|
| | annealed zones | | unannealed zones | | annealed zones | | unannealed zones | |
| Trial No. | average | minimum | average | minimum | average | minimum | average | minimum |
| I | 101 | 90 | 70 | 58 | 136 | 132 | 123 | 117 |
| J | 47 | 24 | 37 | 22 | 85 | 58 | 78 | 63 |

As in the previous examples, it is observed that a flux-cored wire having a low nitrogen content leads to a deposited metal having superior low-temperature impact strength and superior toughness.

Example 5

This Example 5 is similar to Example 1, and is aimed at studying the influence of an increase in the aluminum content on the toughness and impact-strength properties of the weld.

As a matter of fact, aluminum, which normally has a high affinity for nitrogen, fixes this element in the form of nitrides. Moreover, this property of aluminum with respect to nitrogen is used to improve the deformabilities of mild steels and to minimize the ageing phenomena due to the presence of nitrogen in the metal.

In this Example 5, 2 flux-cored wires containing aluminum are used in such a way that the ratio of the aluminum content to the nitrogen content in the wire is greater than 4 ($Al/N_2$ ratio>4).

As previously, the contents of the main constituents of the deposited metal (weld) were determined and are given in Table XI below.

TABLE XI

| Trial No. | C % | Si % | Mn % | S % | P % | Ni % | Al % | Nb % | V % | Ti % | B ppm | O ppm | N ppm |
|---|---|---|---|---|---|---|---|---|---|---|---|---|---|
| K | 0.069 | 0.41 | 1.07 | 0.005 | 0.006 | 0.58 | 0.029 | 0.015 | 0.016 | 0.10 | 20 | 670 | 42 |
| L | 0.068 | 0.42 | 1.13 | 0.004 | 0.006 | 0.7 | 0.031 | 0.014 | 0.016 | 0.088 | 16 | 750 | 76 |

Furthermore, the impact strengths of the test pieces (Trials K and L) were measured at −40° C. in the as-welded state or after stress relieving at 580° C. for 3 hours and are given in Table XII below:

TABLE XII

| | As-welded state, kV (J) | | | | Stress-relieved state, kV (J) | | | |
|---|---|---|---|---|---|---|---|---|
| | annealed zones | | unannealed zones | | annealed zones | | unannealed zones | |
| Trial No. | average | minimum | average | minimum | average | minimum | average | minimum |
| K | 55 | 46 | 16 | 12 | 37 | 30 | 13 | 11 |
| L | 74 | 54 | 50 | 30 | 40 | 26 | 24 | 17 |

It is observed, surprisingly, that an increase in the aluminum content has a negative effect on the toughness and impact-strength properties of the weld at low temperature, this being completely opposite to the observations which have been made hitherto.

This negative effect of aluminum may be explained by the fact that aluminum interferes in the oxido-reduction reactions and, consequently, profoundly modifies the transfers in terms of active elements such as, especially, titanium and silicon.

It follows that, in order to improve the toughness and impact-strength properties of the weld, it is necessary to ensure, on the one hand, that the total nitrogen content of the flux-cored wire is less than 65 ppm and, on the other hand, that the $Al/N_2$ ratio is less than 4, or even less than or equal to 3.

Example 6

This example is similar to the previous examples. The trials below were carried out, as previously, using a STARMATIC current generator of the 502 TRA-CC+ type for a current intensity of 250 A, a voltage of 27 V, a welding speed of 23 cm.min$^{-1}$ and a temperature between passes of 150° C.

The shielding gas used is an ATAL 5A™ mixture (argon+ 18% $CO_2$) and the gas flow rate is approximately 20 l.min$^{-1}$.

The deposits of molten metal were produced by means of 3 flux-cored wires having a diameter of 1.2 mm manufactured on the same basic formula as those of Examples 2, 3 and 5 (rutile wires), but being essentially distinguished by their total aluminum contents, namely:

Trial M: wire containing approximately 0.10% Al,

Trial N: wire containing approximately 0.20% Al,

Trial O: wire containing approximately 0.29% Al.

Impact-strength test pieces were taken from the annealed zones and, by way of comparison, from the as-welded zones which had retained an as-solidified structure.

The impact strengths were measured at −40° C. in the as-welded state and after postwelding heat treatment (stress relieving at 580° C. for 3 h) and the results are given in Table XIII below.

TABLE XIII

| Trial No. | As-welded state, kV (in J) | | | | | | Post-heat-treatment state (*) (in J) | | | | | |
|---|---|---|---|---|---|---|---|---|---|---|---|---|
| | unannealed zones | | | annealed zones | | | unannealed zones | | | annealed zones | | |
| M | 150 | 155 | 157 | 150 | 155 | 169 | 121 | 130 | 151 | 144 | 144 | 149 |
| N | 96 | 100 | 113 | 103 | 117 | 127 | 70 | 70 | 85 | 82 | 93 | 105 |
| O | 40 | 42 | 61 | 14 | 14 | 31 | 10 | 18 | 30 | 14 | 17 | 25 |

(*) heat treatment: heating (50° C./h), holding at 580° C. for 3 h, then cooling (50° C./h).

Next, the contents of the constituents of the deposited metal were determined and are given in Table XIV below.

TABLE XIV

| Trial No. | C % | Si % | Mn % | S % | P % | Ni % | Al % | Nb % | V % | Ti % | B ppm | O ppm | N ppm |
|---|---|---|---|---|---|---|---|---|---|---|---|---|---|
| M | 0.068 | 0.33 | 1.41 | 0.004 | 0.006 | 0.75 | 0.003 | 0.006 | 0.009 | 0.037 | 38 | 410 | 42 |
| N | 0.070 | 0.39 | 1.53 | 0.004 | 0.005 | 0.74 | 0.011 | 0.007 | 0.008 | 0.076 | 46 | 520 | 43 |
| O | 0.069 | 0.41 | 1.58 | 0.004 | 0.005 | 0.77 | 0.015 | 0.007 | 0.007 | 0.092 | 52 | 550 | 38 |

| Trial No. | AS % | Cr % | Mo % | Cu % | Co % | Sn % | Sb % | Al/N ratio |
|---|---|---|---|---|---|---|---|---|
| M | 0.003 | 0.031 | 0.002 | 0.011 | 0.004 | 0.002 | 0.002 | 0.71 |
| N | 0.003 | 0.03 | 0.001 | 0.011 | 0.004 | 0.002 | 0.002 | 2.56 |
| O | 0.003 | 0.03 | 0.001 | 0.010 | 0.004 | 0.002 | 0.002 | 3.95 |

In order to determine the mechanical properties of the welded joints obtained, in the as-welded state or after heat treatment, these were subjected to tensile measurements. The results are given in Table XV below.

TABLE XV

| | As-welded state | | | State after heat treatment | | |
|---|---|---|---|---|---|---|
| Trial No. | M | N | O | M | N | O |
| Tensile strength $R_m$ (MPa) | 598 | 647 | 749 | 565 | 628 | 706 |
| Yield stress $R_{p0.2}$ (MPa) | 510 | 574 | 670 | 473 | 544 | 638 |
| Elongation (%) | 25 | 22 | 19 | 29 | 27 | 21 |
| Reduction in section (%) | 75.3 | 69 | 65 | 75 | 73 | 69 |

The results obtained clearly show that increasing the aluminum content of the deposited metal up to 0.011% in the deposit leads to impact-strength results which remain acceptable at −40° C. in all the welded zones, in the as-welded state and after postwelding heat treatment.

Above this value, there is a very pronounced drop in the impact-strength values in all the welded zones, in particular after postwelding heat treatment.

In parallel with this change in toughness, there is an increase in the tensile strength and the yield stress and a decrease in the ductility properties (elongation and reduction in section).

The use of flux-cored wires according to the invention, in particular of the rutile or slag-free type, makes it possible to obtain, in the molten zone of the welded joint, excellent low-temperature toughness properties, i.e. down to temperatures of about −50° C. to −60° C., this being so both in the as-welded state and after a subsequent heat treatment, in particular when the total nitrogen content of the wire is less than 65 ppm and the ratio of the aluminum content to the nitrogen content is less than 3.

What is claimed is:

1. Welding process wherein a welded joint is produced by melting at least part of a cored-wire by supplying a welding energy to said cored-wire, said cored-wire being composed of at least one outer metal sheath and at least one central core comprising filling elements, and containing, with respect to the total weight of the wire:

nitrogen less than 75 ppm nitrogen,
from 0.20% to 1% silicon,
from 1% to 2.5% manganese,
less than 7% titanium,
from 1 ppm to 110 ppm boron,
aluminum less than 0.3%,
from 10 ppm to 200 ppm niobium, and
from 10 ppm to 200 ppm vanadium.

2. Welding process according to claim 1, wherein the cored-wire further contains from 300 ppm to 0.14% of carbon.

3. Welding process according to claim 1, wherein the cored-wire further contains from 0.2% to 1% of at least one of magnesium and zirconium.

4. Welding process according to claim 1, wherein the cored-wire further contains from 0.01% to 0.35% of at least one of sodium, potassium and lithium.

5. Welding process according to claim 1, wherein the cored-wire further contains from 0.03% to 10% fluorine.

6. Welding process according to claim 1, wherein the cored-wire further contains less than 0.02% of at least one of sulfur, phophorus, tin, antinomy and arsenic.

7. Welding process according to claim 1, wherein the cored wire contains of between 2% and 7% titanium.

8. Welding process according to claim 1, wherein the outer sheath of the cored-wire represents at least 50% of the total weight of the cored wire.

9. Welding process according to claim 1, wherein the cored wire has a diameter of between 0.8 mm and 2.4 mm.

10. Welding process according to claim 1, wherein the cored wire is chose from among 'rutile' type or 'metal-cored type wires.

11. Welding process according to claim 1, wherein the cored wire contains nitrogen less than 60 ppm.

12. Welding process according to claim 1, wherein the cored wire contains nitrogen less than 50 ppm.

13. Welding process according to claim 1, wherein the cored wire contains from 0.2% to 0.9% silicon.

14. Welding process according to claim 1, wherein the cored wire contains from 10 ppm to 130 ppm of at least one of niobium and vanadium.

15. Welding process according to claim 1, wherein the cored wire contains from 1 ppm to 0.2% aluminum.

16. Welding process according to claim 1, wherein the cored wire contains from 10 ppm to 110 ppm boron.

17. Welding process according to claim 1, wherein the cored wire contains from 1.2% to 2% manganese.

18. Welding process according to claim 1, wherein the cored wire is a 'rutile'-type wire and contains from between 3 and 12% $TiO_2$ and from between 0.03% and 0.15% fluorine.

19. Welding process according to claim 1, wherein the cored wire is a metal-core type wire and contains from between 80 ppm and 2000 ppm titanium and from between 0.02% and 0.15% fluorine.

20. Welding process according to claim 1, wherein the cored wire contains aluminum and nitrogen, the ratio (Al/$N_2$) of the aluminum content to the nitrogen content being less than 4.

21. Welding process according to claim 1, wherein the cored wire contains aluminum and nitrogen, the ratio (Al/$N_2$) of the aluminum content to the nitrogen content being less than or equal to 3.

22. Welding process according to claim 1, wherein the welding is operated under a gas shielding.

23. Welding process according to claim 22, wherein the shielding gas is a mixture of argon and $CO_2$.

24. Welding process according to claim 1, wherein the cored-wire is melted by supplying a welding energy of between 6 and 40 $kJ.cm^{-1}$.

25. Welding process according to claim 1, which is a MAG gas shielding welding process.

26. Welding process according to claim 1, wherein the welded joint obtained by melting of at least part of the cored-wire contains, with respect to the total weight of the weld:
nitrogen less than 80 ppm nitrogen,
from 0.02% to 0.07% oxygen,
from 0.02% to 0.12% carbon,
from 0.15% to 0.6% silicon,
from 1% to 1.9% manganese,
less than 0.02% sulfur,
less than 0.02% phosphorus,
from 0.0025% to 0.08% titanium,
from 3 ppm to 80 ppm boron,
aluminum less than 0.03%,
from 10 ppm to 0.02% niobium, and
from 10 ppm to 0.02% vanadium.

27. Welding process according to claim 1, wherein the welded joint further contains less than 3.5% nickel, less than 0.5% chromium, less than 0.7% molybdenum and less than 0.6% copper.

28. Welding process according to claim 1, wherein the welded joint contains aluminum and nitrogen, the ratio (Al/N) of the aluminum content to the nitrogen content being less than or equal to 3.

29. Welding process according to claim 1, wherein the welded joint has a Bruscato coefficient (X) such that:

$$X=0.1\times[P]+0.05\times[Sb]+0.04\times[As]+0.01\times[Sn]$$

with X<20 ppm
where [P], [Sb], [As] and [Sn] are the total amounts (in ppm) of phosphorus, antinomy, arsenic and tin, respectively, in the welded joint.

30. Welding process according to claim 1, wherein the welded joint is realize on steel.

31. Welding process according to claim 1, wherein the welded joint is realized on a structural steel selected from the group consisting of an oil facility, a storage tank, an offshore platform, a bridge structure or a ship structure.

32. Welding process wherein a welded joint is produced by melting at least part of a cored-wire having a diameter of between 0.8 mm and 2.4 mm by supplying a welding energy of between 6 and 40 $kJ.cm^{-1}$ to said cored-wire, said cored-wire being composed of at least one outer metal sheath and at least one central core comprising filling elements, the outer sheath of the cored-wire representing at least 50% of the total weight of the cored wire, and wherein the welded joint obtained by melting of at least part of the cored-wire contains, with respect to the total weight of the weld:
nitrogen less than 50 ppm nitrogen,
from 0.02% to 0.07% oxygen,
from 0.02% to 0.12% carbon,
from 0.15% to 0.6% silicon,
from 1% to 1.9% manganese,
less than 0.02% sulfur,
less than 0.02% phosphorus,
from 0.0025% to 0.08% titanium,
from 3 ppm to 80 ppm boron,
aluminum less than 0.03%,
from 10 ppm to 0.02% niobium, and
from 10 ppm to 0.02% vanadium.

33. MAG gas shielding welding process wherein a welded joint is produced by melting at least part of a cored-wire having a diameter of between 0.8 mm and 2.4 mm by supplying a welding energy of between 6 and 40 $kJ.cm^{-1}$ to said cored-wire, said cored-wire being composed of at least one outer metal sheath and at least one central core comprising filling elements, the outer sheath of the cored-wire representing at least 50% of the total weight of the cored wire, said cored-wire containing, with respect to the total weight of the wire:
nitrogen less than 75 ppm nitrogen,
from 0.20% to 1% silicon,
from 1% to 2.5% manganese,
less than 7% titanium,
from 1 ppm to 110 ppm boron,
aluminum less than 0.3%,
from 10 ppm to 200 ppm niobium, and
from 10 ppm to 200 ppm vanadium.
and wherein the welded joint obtained by melting of at least part of the cored-wire contains, with respect to the total weight of the weld:

nitrogen less than 50 ppm nitrogen,
from 0.02% to 0.07% oxygen,
from 0.02% to 0.12% carbon,
from 0.15% to 0.6% silicon,
from 1% to 1.9% manganese,
less than 0.02% sulfur,
less than 0.02% phosphorus,
from 0.0025% to 0.08% titanium,
from 3 ppm to 80 ppm boron,
aluminum less than 0.03%,
from 10 ppm to 0.02% niobium, and
from 10 ppm to 0.02% vanadium.

* * * * *